April 22, 1952 E. J. SLATTERY 2,593,927

CABINET FOR SOUND RECORD DISKS

Filed Oct. 14, 1947 3 Sheets-Sheet 1

Inventor

EDWARD J. SLATTERY,

By Charles V. Imlay

Attorney

Inventor
EDWARD J. SLATTERY,
By Charles V. Imlay
Attorney

Inventor
EDWARD J. SLATTERY,

By Charles V. Imlay
Attorney

Patented Apr. 22, 1952 2,593,927

UNITED STATES PATENT OFFICE 2,593,927

CABINET FOR SOUND RECORD DISKS

Edward J. Slattery, Montgomery County, Md.

Application October 14, 1947, Serial No. 779,819

1 Claim. (Cl. 211—40)

My invention consists in a new and useful improvement in cabinets for sound record discs and is designed to provide a cabinet having a plurality of slots for reception of the discs, which are so designed as to facilitate the insertion of the discs therein and to insure protection of the records against injury when the discs are inserted and removed. The particularly novel features of my improved cabinet are the provision in one form of a transparent top plate in which the slots are provided, and in another form an open framework in which the slots are formed, the peculiar relation in each of the slots of three sets of relatively spaced parallel walls forming suitable grooves to receive three portions of the periphery of the disc inserted into the slot, and converging walls of the slot designed to contact only the periphery of the disc to guide it into the grooves, so as to insure protection of the record. Another novel feature of my improved cabinet is the provision on the upper face of the top of the cabinet of suitably treated areas adjacent the slots to receive indicia non-indelibly inscribed thereon for identifying the discs deposited in the slots.

While I have illustrated in the drawings and have hereinafter fully described certain specific embodiments of my invention, it is to be distinctly understood that I do not consider my invention to be limited to said specific embodiment but refer for its scope to the claims appended hereto.

Figure 1:
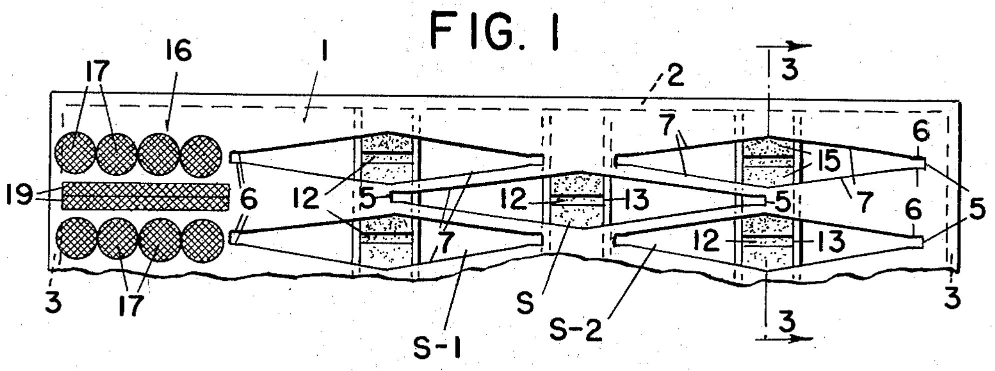
Fig. 1 is a fragmentary top plan of the cabinet.
Figure 2:
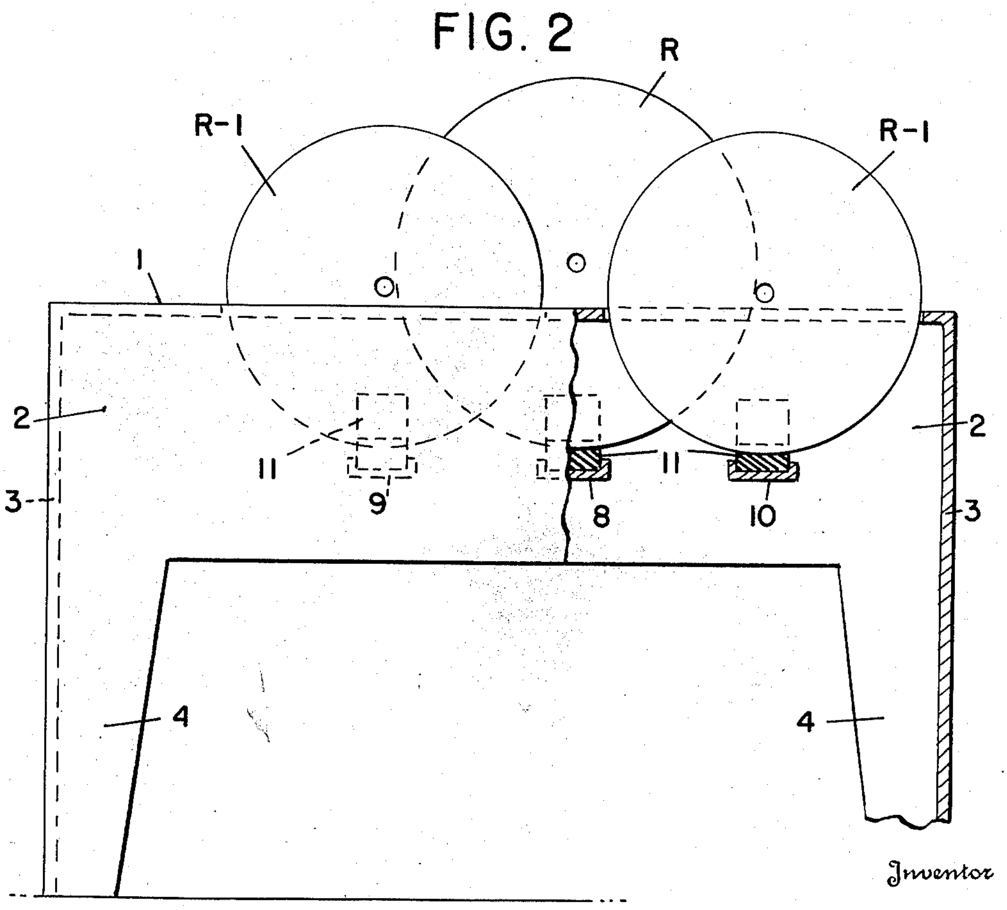
Fig. 2 is a part end elevation and a part transverse vertical section of the cabinet.
Figure 3:
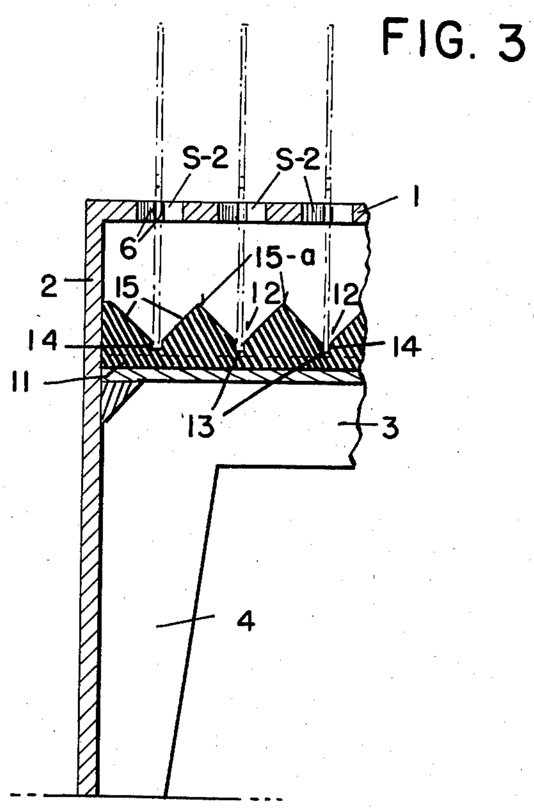
Fig. 3 is a fragmentary vertical section on the line 3—3 of Fig. 1, in the direction of the arrows.
Figure 4:
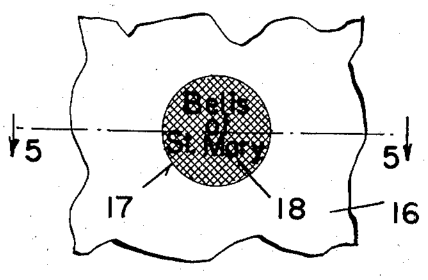
Fig. 4 is a greatly enlarged fragmentary top plan of a detail showing one of the index areas.
Figure 5:
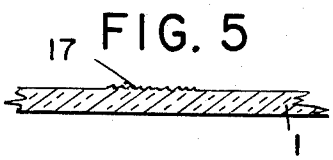
Fig. 5 is a vertical section on the line 5—5 of Fig. 4, in the direction of the arrows.

As illustrated in Figs. 1 to 7 of the drawings, my improved cabinet comprises a quadrilateral top 1, end walls 2 and side walls 3 depending from the edges of the top 1, the cabinet being supported on legs 4. The top 1 is provided by a plate of transparent material, such as a suitable plastic, and has a plurality of sets of slots S, S–1 and S–2 (Fig. 1). Each of these slots has at each of its ends a vertical end wall 5 which is parallel with the side walls 3 of the cabinet, and parallel relatively spaced vertical side walls 6 normal to the walls 5. Each of the slots has a pair of convergent, vertical walls 7 extending from the transverse axis of the slots to the inner ends of the walls 6, at each end of the slot.

The slots S are so disposed in the top 1 that their said transverse axes lie in a vertical plane parallel with and spaced laterally of the longitudinal axis of the top 1. The slots S–1 and S–2 are so disposed in the top 1 that their transverse axes, respectively, lie in vertical planes parallel with and symmetrically spaced on either side of the plane of the said axes of slots S.

The cabinet is provided with three struts 8, 9 and 10 so mounted in and extending between the end walls 2, and equally spaced below the top 1, that their longitudinal axes lie in the vertical plane passing through the said transverse axes of the slots S, S–1, and S–2, respectively. Suitably mounted in each of the struts 8, 9 and 10 there is a cushion 11 of suitable resilient material such as rubber. Each cushion 11 has a plurality of transverse slots 12 each having a horizontal end wall 13 and a pair of parallel, relatively spaced, vertical side walls 14. These slots 12 are so disposed that their longitudinal axes lie in vertical planes which bisect the transverse axes of the slots S, S–1 and S–2, and their vertical side walls 14 lie in the vertical planes of the vertical side walls 6 of the slots S, S–1 and S–2. Each cushion 11 is provided with downwardly convergent pairs of walls 15 extending from the upper edge of the cushion 11 to the upper ends of the walls 14 of the slots 12, respectively. The disposition of these walls 15 is such that a series of apices 15–*a* is produced by adjoining pairs of walls 15 at the upper edge of the cushion 11.

The top 1 is provided adjacent the outer end walls 5 of the slots S–1 with a rectangular surface portion 16 to provide areas to serve as an index of records received in slots S, S–1 and S–2. Aligned with each pair of slots S–1 and S–2, there are provided four areas 17. Each area 17 is suitably treated, as by roughening, to adapt it to have inscribed, non-indelibly, thereon suitable identifying indicia 18 for one of the four selections of the two double-face record discs received in the pair of slots S–1 and S–2. Aligned with each slot S, there is provided a pair of superposed rectangular areas 19, each suitably treated for inscribing indicia for one of the two selections of the double-face record disc received in the slot S.

Figure 6:
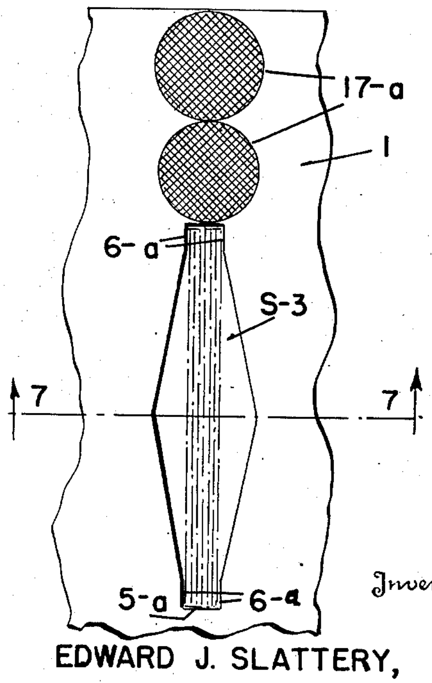
Fig. 6 is a fragmentary top plan of a modified form of slot to accommodate a plurality of records.
Figure 7:
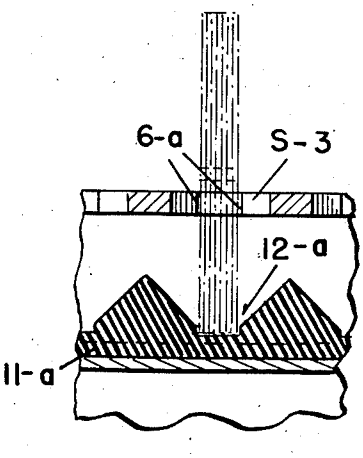
Fig. 7 is a vertical section on the line 7—7 of Fig. 6, in the direction of the arrows.

In Figs. 6 and 7, there is illustrated a modified form of slot for receiving a plurality of records, viz. the contents of a record album. In this form, the slot S–3 has end walls 5–*a* sufficiently long enough to admit the desired number of discs into the slot, the side walls 6–*a* being relatively spaced accordingly. It is obvious that this form has slots 12–*a* in the cushion 11–*a* corresponding in dimensions with the slots S–3. Suitable areas 17–*a* are provided adjacent slots S–3 for inscribing indicia for the album and the selections thereof.

Figure 8:
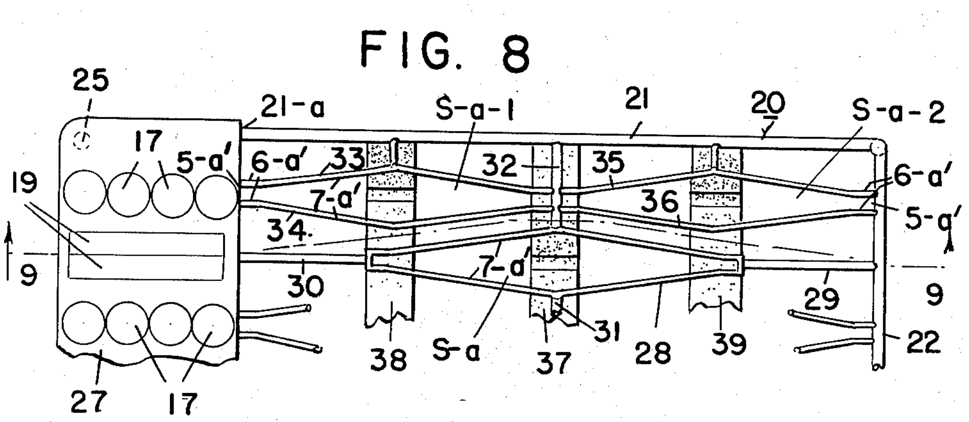
Fig. 8 is a fragmentary top plan, similar to Fig. 1, of a modified form of cabinet.
Figures 9, 10:
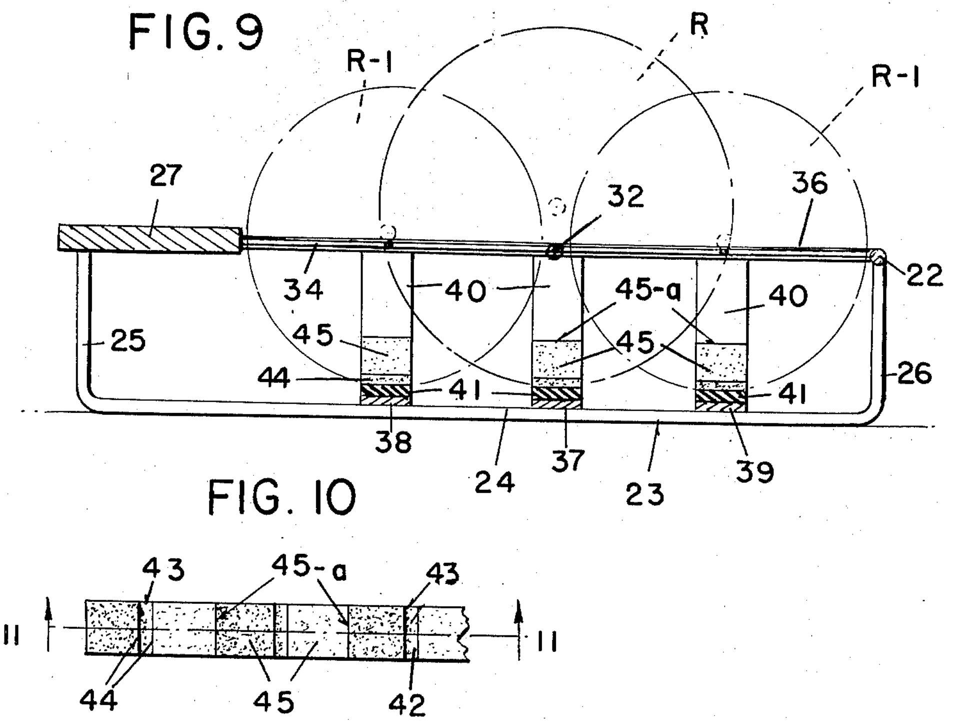
Fig. 9 is a transverse, vertical section on the line 9—9 of Fig. 8, in the direction of the arrows.
Fig. 10 is a fragmentary top plan of the longitudinal supporting cushions.
Figure 11:
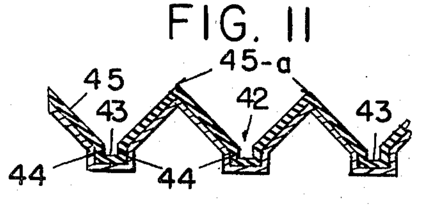
Fig. 11 is a vertical section on the line 11—11 of Fig. 10 in the direction of the arrows.

The form of the cabinet illustrated in Figs. 8 to 11 differs from the form illustrated in Figs. 1 to 7 in that the top, end and side walls are eliminated, there being merely a framework of suitably fabricated supporting media such as rods, tubing or wire. As shown in Figs. 8 and 9, there is a member 20 contorted to form upper end rails 21 and an upper side rail 22. There is a pair of members 23 contorted to form lower end rails 24 and standards 25 and 26 at the ends of rails 24. A plate 27 of suitable material and having proper dimensions is supported by the standards 25 and is attached to ends 21–*a* of the rails 21. Standards 26 are attached to the rails 21 at their junctions with rail 22. The member 20, the members 23 and the plate 27, associated as described, constitute a supporting framework.

This form of the device has a plurality of sets of disc receiving slots S–*a*, S–*a*–1 and S–*a*–2, corresponding to the slots S, S–1 and S–2 of the cabinet illustrated in Figs. 1 to 5. Each slot S–*a* is provided by a member 28 contorted to form vertical end walls 5–*a*′, side walls 6–*a*′ and convergent walls 7–*a*′, corresponding to the walls 5, 6 and 7 of the cabinet of Figs. 1 to 5. The members 28 are supported in the framework by struts 29 between the side rail 22 and members 28, struts 30 between the plate 27 and members 28, struts 31 connecting members 28 with one another, and struts 32 connecting members 28 at the ends of the set with the end rails 21. Each slot S–*a*–1 is provided by a pair of members 33, 34 contorted to form walls 6–*a*′ and 7–*a*′ substantially identical with walls 6–*a*′ and 7–*a*′ of the slots S–*a*. The members 33 and 34 have their ends attached to the plate 27 and struts 31, 32, respectively, to form walls 5–*a*′ substantially identical with the walls 5–*a*′ of slots S–*a*. Each slot S–*a*–2 is provided by a pair of members 35, 36 contorted to form walls 6–*a*′ and 7–*a*′ substantially identical with walls 6–*a*′ and 7–*a*′ of the slots S–*a* and S–*a*–1. The members 35, 36 have their ends attached to the side rail 22 and struts 31, 32, respectively, to form walls 5–*a*′ substantially identical with walls 5–*a*′ of the slots S–*a* and S–*a*–1.

The device is provided with three longitudinal strap members 37, 38 and 39 mounted on the lower end rails 24 and having upwardly projected end portions 40 connected to the upper end rails 21. These strap members 37, 38 and 39 are so disposed that their longitudinal axes lie in the vertical planes passing through the transverse axes of the slots S–*a*, S–*a*–1 and S–*a*–2, respectively. Suitably mounted on each of the straps 37, 38 and 39, there is a cushion 41 of suitable resilient material such as rubber. The straps 37, 38 and 39 and their overlying cushions 41 are contorted to form a plurality of transverse slots 42, each having a horizontal end wall 43, and a pair of parallel, relatively spaced, vertical side walls 44. The slots 42 and their end walls 43 and their side walls 44 are substantially identical with slots 12 and their end walls 13 and their side walls 14 of the cabinet illustrated in Figs. 1 to 5. These slots 42 are so disposed that their longitudinal axes lie in the planes which bisect the transverse axes of the slots S–*a*, S–*a*–1 and S–*a*–2, and their side walls 44 lie in the vertical planes of the side walls 6–*a*′ of the slots S–*a*, S–*a*–1 and S–*a*–2. The straps 37, 38 and 39 and their overlying cushions 41 are also contorted to provide downwardly convergent pairs of walls 45 extending from the upper edges of the cushions 41 to the upper ends of the walls 44 of the slots 42. The disposition of these walls 45 is such that a series of apices 45–*a* is provided by adjoining pairs of walls 45, at the upper edges of the cushions 41.

The members 28, 33, 34, 35 and 36 are suitably coated with any suitable resilient material, such as rubber, to provide non-abrasive surfaces about the slots S–*a*, S–*a*–1 and S–*a*–2.

The plate 27 corresponds to the portion 16 of the cabinet illustrated in Figs. 1 to 5 and is provided with the indexing areas 17 and 19 as provided in the cabinet illustrated in Figs. 1 to 5.

From the foregoing description of the details of construction of my improved cabinet, its use will be apparent. It is obvious that when a record disc is inserted into one of the slots its periphery contacts the convergent walls of the slot which guide the periphery into the grooves at the ends of the slot. When the disc has passed downwardly through the slot, its periphery at its lowest portion contacts one of the convergent walls of the cushion which guides it into the groove in the cushion. It will be noted that when a disc is thus inserted into a slot only its periphery can come in contact with the walls of the slot so that its record surface is fully protected against marringly accidental contact with the walls of the slot.

Having described my invention, what I claim is:

In a disc holder, the combination of a horizontal guide member provided with a plurality of lozenge-shaped openings having rectilinear edges with slots having rectilinear edges extending from the acute-angle ends of said openings, the said edges of said slots being parallel with the longitudinal axes of the openings passing through said ends, said openings being arranged in three sets, the openings of each set having their transverse axes passing through their obtuse-angle ends lying in a common vertical plane, the said common vertical planes of the three sets being parallel, the openings of two of said sets having their said longitudinal axes lying in common vertical planes, the openings of the third set being rested between the openings of said two sets and the slots of said third set extending to the planes in which lie the transverse axes of said two sets; and three supporting members over which said guide member is so mounted that the said common vertical planes passing through the transverse axes of the three sets of openings, respectively, pass through the longitudinal axes of the three supporting members, respectively, each of said supporting members having a plurality of grooves in its upper face, and the longitudinal axes of the grooves of each supporting member lying in the vertical planes passing through the longitudinal axes of the openings of one of the sets in the guide member.

EDWARD J. SLATTERY.

REFERENCES CITED

The following references are of record in the file of this patent:

UNITED STATES PATENTS

| Number | Name | Date |
|---|---|---|
| 801,149 | Meaker | Oct. 3, 1905 |
| 838,121 | Kollie et al. | Dec. 11, 1906 |
| 888,855 | Sisco | May 26, 1908 |
| 1,167,063 | Haag | Jan. 4, 1916 |
| 1,310,814 | Ward | July 22, 1919 |
| 1,322,313 | Layman | Nov. 18, 1919 |
| 1,781,056 | Elder | Nov. 11, 1930 |
| 1,985,670 | Sykes | Dec. 25, 1934 |
| 1,992,712 | Mojonnier | Feb. 26, 1935 |
| 2,121,225 | Ghrist | June 21, 1938 |
| 2,354,872 | Mitnick | Aug. 1, 1944 |
| 2,428,681 | Pratt et al. | Oct. 7, 1947 |
| 2,454,516 | Laureyns | Nov. 23, 1948 |
| 2,458,699 | Ginsberg | Jan. 11, 1949 |

FOREIGN PATENTS

| Number | Country | Date |
|---|---|---|
| 534,822 | France | Jan. 13, 1922 |